Nov. 13, 1951          J. MIHALYI          2,575,024

ROLL FILM CAMERA UTILIZING SPRING CLOSED FILM RETORT

Filed Feb. 20, 1947

JOSEPH MIHALYI
INVENTOR

BY *Newton M. Perrins,*
*Donald H. Stewart*
ATTORNEYS

Patented Nov. 13, 1951

2,575,024

UNITED STATES PATENT OFFICE 2,575,024

ROLL FILM CAMERA UTILIZING SPRING CLOSED FILM RETORTS

Joseph Mihalyi, Rochester, N. Y., assignor to Eastman Kodak Company, Rochester, N. Y., a corporation of New Jersey Application February 20, 1947, Serial No. 729,759

6 Claims. (Cl. 95—31)

This invention relates to photography and more particularly to winding and reeling apparatus for roll film cameras. One object of my invention is to provide a camera which can be quickly and easily loaded. Another object of my invention is to provide a camera construction so arranged that a film cartridge can be inserted in a camera in light-tight condition, after which it will be opened to move film therefrom and to return film to the cartridge and closed before the cartridge is removed from the camera. A still further object of my invention is to provide a quick-loading camera which eliminates the usual threading of the film through the camera. Other objects will appear from the following specification, the novel features being particularly pointed out in the claims at the end thereof.

In cameras, and particularly in cameras employing film spools of small size, such as, 16-mm., 20-mm., and 35-mm. in width, the film is usually more difficult to load than in cameras employing film of greater width because of the small dimensions of the film. Moreover, it is usually more difficult to make small film cartridges sufficiently light-tight to prevent even the very small amount of fogging at the edges of the film which may spoil exposures.

In my copending application for light-tight photographic film cartridge, Ser. No. 729,760 filed February 20, 1947, now Patent No. 2,552,200, issued May 8, 1951, I have shown and described a preferred form of film cartridge which may be used with the camera construction described herein.

Coming now to the drawings wherein like reference characters denote like parts throughout:

My invention consists broadly in providing a light-tight film cartridge which comprises a film spool having shoulders around the peripheries of the flanges to receive a spring sheath which forms a light-tight connection with the shoulders on the film spool flanges; this sheath preferably being provided with a pair of outwardly-projecting handles. This film cartridge is insertable in a film spool chamber and when a movable part of the camera is moved in loading the camera, or in positioning the film spool for use, relatively movable parts engage the handles of the film cartridge and open the spring sheath providing a slot through which film may be propelled across an exposure frame for exposure.

Figure 4:
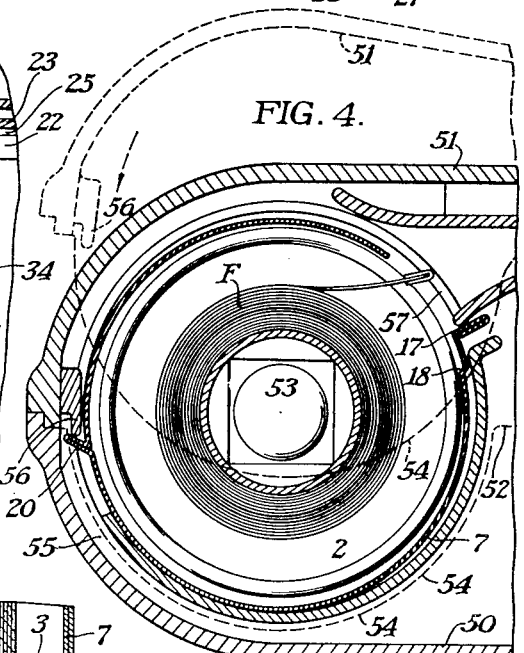
Fig. 4 is a fragmentary view similar to the other views but showing a second preferred embodiment of my invention with the camera back in a closed position.
Figure 5:
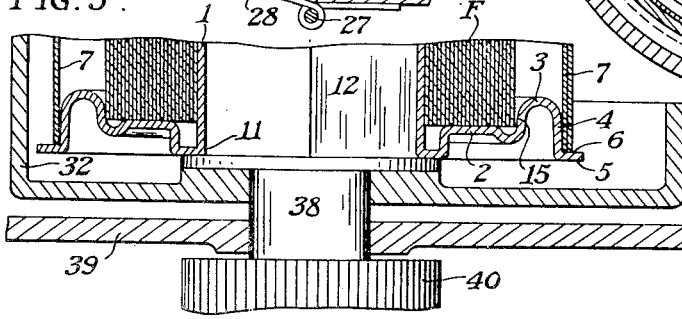
Fig. 5 is an enlarged sectional view taken through a portion of the film cartridge and its supporting chamber.

More specifically, as described in my copending application above referred to, a preferred form of film cartridge may consist of a spool including a hub 1 to which flanges 2 are affixed at both ends. These flanges have inwardly-formed, ring-like members 3 extending toward each other, the material being formed outwardly to form a generally-cylindrical surface 4, terminating in an outwardly-extending flange 5, as shown in Fig. 4. Thus, there is a right angle shoulder 6 against which a spring sheath 7 may rest to form a light-tight connection therewith.

The flanges 2 may be provided with any required opening to receive a film-supporting shaft designated broadly as 8 and, in the present instance, I provide the upper flange 2 with an opening 9 which is substantially circular in shape with extensions 10 leading from the round aperture 9, and I prefer to provide the lower flange with a square opening 11 to receive the square lower end 12 of the shaft 8. The upper end 13 of this shaft is preferably of rounded construction so that the spool may be slid on the shaft in only one direction. The square end of the shaft 12 may be carried by a smaller shaft 38 passing through a camera wall 39 so that a winding handle or knob 40 on the outside of the camera may be used to turn the shaft for winding and unwinding the film "F" on the support.

Convolutions of film "F" are wound on the hub member 1 and they are held against "clock springing" by means of the inside surface 15 of the annular formings 3. Thus, these formings not only prevent the film "F" from unwinding but they also provide a light-tight connection for the spring sheath 7 and the film spool.

Figure 1:
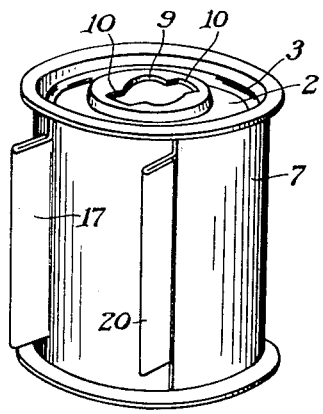
Fig. 1 is a light-tight film cartridge of a type to be employed in a camera construction illustrating my presenti nvention.
Figure 2:
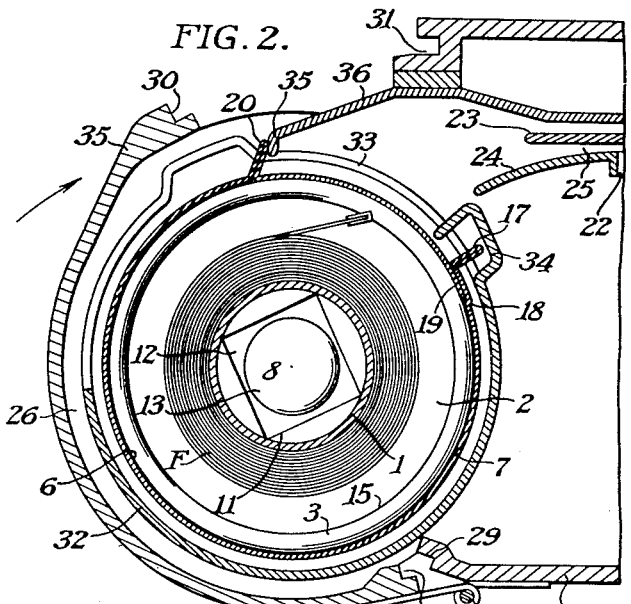
Fig. 2 shows a sectional view through a film spool loading chamber and illustrating a preferred form of a camera which may be rapidly loaded with my improved form of film cartridge. In this view, the film cartridge receptacle is in a partially-opened position.

The film sheath 7 may consist of a springy sheet of material, preferably metal, having a tendency to close upon the shoulders 6 of the film flanges 2. As shown in Fig. 2, one end of the material may be formed into a double thickness and may be bent outwardly, as indicated at 17, to form a handle and a shoulder 18 may be provided adjacent the handle to receive the end 19 of the spring sheath so that the entire sheath may lie flat against the annular shoulders 6. At a place spaced from the end 19, I provide a second handle 20 which may project outwardly, these two handles serving as opening members for the spring sheath when the film cartridge has been loaded into a camera.

Figure 3:
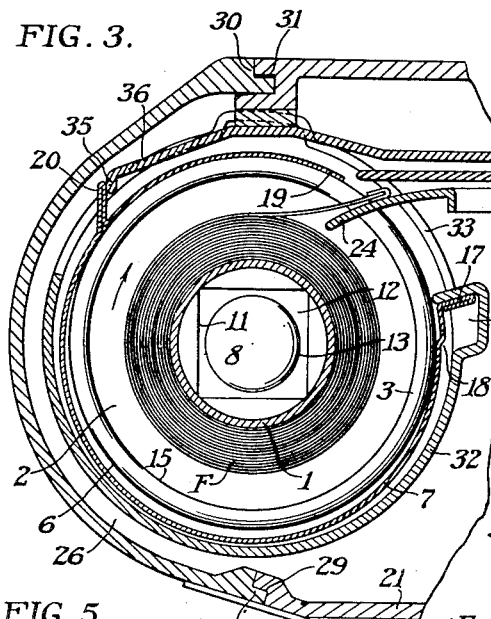
Fig. 3 is a fragmentary view similar to Fig. 2 but with the spool chamber in a completely closed position.

A preferred film receptacle is shown in Figs. 2 and 3. In these figures the camera body 21 is provided with the usual exposure frame 22 and a film chute is included between two plates 23 and 24 through which film may be propelled to and from the exposure frame for exposure. The space 25 between the walls 23 and 24 is just sufficient to pass a single layer of film and the film will be held flat in this space without the usual pressure pad because no film-backing paper is employed.

There is a film spool chamber 26 which, in this instance, is hingedly attached at 27 to the camera body; this swinging chamber being provided with a rabbet 28 fitting into the rabbet 29 of the camera body 21 to form a light-tight connection therewith. A similar rabbet 30 interfits with the rabbet 31 of the camera body 21 when the swinging spool chamber 26 is moved to a completely closed position. Fig. 2 shows this spool chamber in a partially-opened position.

The spool chamber 26 carries a generally cylindrical receptacle 32 which has an opening 33 of greater width than the width of the film F and which is provided with a groove 34 and finger 35. This groove and finger are spaced apart to receive and engage the handles 17 and 20 when the film cartridge is placed in the spool chamber 26 and by swinging the spool chamber 26 upon its hinge 27 to close the camera, the handle 20 is brought opposite the opening finger 35 which is carried by an arm 36 inside of the camera body. Thus, when the spool chamber 26 is moved in the direction shown by the arrow slightly further towards a closed position in Fig. 2, the opening finger 35 will engage the handle 20 and it will gradually open the spring sheath as the closing movement continues. The overlap of the parts is so arranged that the slot will only open after the camera chamber flanges engage, or start to engage, so that light is prevented from reaching the film F in any reasonable quantities. The film is backed film with a so-called "gray backing" which is well known in the art, so that a small amount of light striking the end of this film will not penetrate more than a convolution, or so, so that for all intents and purposes the film is in a completely light-tight condition at all times.

From Fig. 3 it will be noticed that the end 19 of the sheath has been drawn away from the rabbet 18, which formerly received it, and the spring sheath 7 is moved out away from a portion of the shoulders 6 extending around the spool flanges 2. However, the end 19 and the rabbet 18 still remain beneath the shoulder 6 so that after the film has been propelled through the chute, exposed, and returned to the film cartridge, the sheath will automatically close again under its own spring tension as the spool chamber 26 is swung to an open, or loading position.

Fig. 4 illustrates still another embodiment of my invention in which a roll film camera 50 is provided with a camera back 51 of a rather normal type in that the camera back is hinged at the opposite end (not shown) and parts from the camera body on a line 52 extending through the middle of the camera. In this instance, the film cartridge may be loaded axially on the film-supporting shaft 53 since the camera back carries an arcuate section 54 on one side which is opened when the camera back is swung to an open position. However, the film spool chamber 55 is not moved during this operation but there are relatively movable parts in the camera back 51 and the spool chamber 55 which are moved relative to each other in loading. The camera back carries an opening finger 56 which is adapted to engage a handle 20 of the spring sheath 7 so that when the camera back 51 is moved downwardly in the direction of the arrow in loading, the spring sheath is opened as before to provide a passageway 57 for the film. With both of these embodiments of my invention there are two relatively movable parts on the camera, one of which moves relative to the other in loading and unloading the camera. The parts may be so arranged that one will engage a handle on the spring sheath to open the sheath as the parts are moved and to permit the sheath to close under its own spring as they are again moved to unload the camera. From the above description it will be seen that I have provided a camera in which many of the usual steps taken in loading are eliminated.

I claim:

1. A roll-holding camera for use with retorts comprising a film spool having flanges, convolutions of film wound thereon, a protective generally tubular spring sheath having normally overlapping ends and surrounding the film and engaging the flanges of the film spool, a first and a second handle on the spring sheath to separate the overlapping ends, the combination with a camera body of a two-part spool chamber carried by the camera body to receive a retort, one part being movably carried by the camera body and the other part being immovably carried thereby, the movable part being movable to insert and remove a retort in the spool chamber, a film spool engaging shaft and a winding knob carried by a spool chamber part, a first retort handle-engaging member carried by the immovable camera spool chamber part for engaging the first retort handle, a second retort handle-engaging member carried by the movable camera spool chamber part whereby the fixed and movable spool chamber parts may be moved together to close the spool chamber and separate the first and second retort handles to separate the overlapping ends of a retort therein.

2. A roll-holding camera as defined in claim 1 characterized in that the movable part of the two-part spool chamber carries the film spool engaging shaft.

3. A roll-holding camera as defined in claim 1 characterized in that the movable part of the two-part spool chamber carries the film spool engaging shaft, to swing with the movable part to and from an open or loading position in which the film spool engaging shaft is removed from the immovable part of the spol chamber to enable the film spool to be loaded by sliding the film spool axially on the spool engaging shaft.

4. A roll-holding camera for use with retorts comprising a film spool having flanges, convolutions of film wound thereon, a protective generally tubular spring sheath having normally overlapping ends and surrounding the film and engaging the flanges of the film spool, a first and a second handle on the spring sheath to separate the overlapping ends, the combination with a camera body of a two-part spool chamber carried by the camera body to receive a retort, a film spool engaging shaft carried by one part of the spool chamber, a winding knob thereon, one part of the spool chamber being movably carried by the camera body and the other part being immovably carried thereby, the movable part being movable to insert and remove a retort in the spool chamber, a first retort handle-engaging member carried by the immovable camera spool chamber part for engaging the first retort handle, a second retort handle engaging member carried by the movable camera spool chamber part whereby the fixed and movable spool chamber parts may be moved together to close the spool chamber and separate the first and second retort handles to separate the overlapping ends of a retort therein, the immovable part of the spool chamber supporting the film spool engaging shaft and the winding knob, the movable part of the spool chamber being mounted for movement relative to the fixed part a distance to expose the film engaging post for axial loading of a film spool thereon.

5. A roll-holding camera as defined in claim 4 characterized by the fixed part of the spool chamber carrying the film spool engaging shaft, and by the movable part being hingedly attached thereto and movable to uncover the film spool engaging shaft for axial loading of a film spool on the shaft, the first retort handle engaging member carried by the fixed part engaging one retort handle and the second retort handle engaging member being carried by the movable part of the spool chamber having a path of movement engaging the second retort handle to move the spring sheath carried by the film spool a distance to separate the edges thereof to pass a film therethrough when the winding knob is turned.

6. A roll-holding camera as defined in claim 4 characterized by the fixed part of the spool chamber carrying the film spool engaging shaft and by the movable part being hingedly attached thereto and movable to uncover the film spool engaging shaft for axial loading of a film spool on the shaft, the first retort handle engaging member carried by the fixed part engaging one retort handle and the second retort handle engaging member being carried by the movable part of the spool chamber having a path of movement engaging the second retort handle to move the spring sheath carried by the film spool a distance to separate the edges thereof to pass a film therethrough when the winding knob is turned, the movable and immovable spool chamber parts being positioned to spring the edges of the spring sheath apart during the last part of the closing movement between the movable and immovable spool chamber parts, and a film chute comprising a pair of spaced plates separated adjacent the spool chamber a distance greater than the opening between the edges of the spring sheath to receive a film propelled through the separated ends by the spool engaging shaft winding knob.

JOSEPH MIHALYI.

REFERENCES CITED

The following references are of record in the file of this patent:

UNITED STATES PATENTS

| Number | Name | Date |
|---|---|---|
| 1,256,931 | Schlicker | Feb. 19, 1918 |
| 1,527,476 | Gianetto | Feb. 24, 1925 |
| 1,685,010 | Thornton | Sept. 18, 1928 |
| 2,218,245 | Lindenberg | Oct. 15, 1940 |
| 2,298,574 | Lockhart | Oct. 13, 1942 |
| 2,319,530 | Bolsey | May 18, 1943 |

FOREIGN PATENTS

| Number | Country | Date |
|---|---|---|
| 620,062 | France | Jan. 12, 1927 |
| 410,071 | Great Britain | May 10, 1934 |
| 619,325 | Germany | Sept. 27, 1935 |
| 650,013 | Germany | Sept. 9, 1937 |